Figure 1:
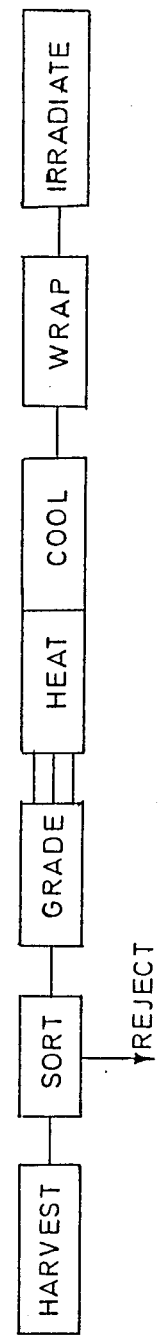

United States Patent [19]

Butland

[11] Patent Number: 4,764,385
[45] Date of Patent: Aug. 16, 1988

[54] PROCESS FOR PRESERVING FRESH FRUIT AND VEGETABLES

[76] Inventor: Peter Butland, P.O. Box 210, Caledon, Ontario, L0N 1C0, Canada

[21] Appl. No.: 13,064

[22] Filed: Feb. 10, 1987

[51] Int. Cl.⁴ .............................................. A23L 3/10
[52] U.S. Cl. .................................. 426/241; 426/240; 426/412
[58] Field of Search ............... 426/240, 241, 324, 325, 426/412

[56] References Cited

U.S. PATENT DOCUMENTS 3,578,463  5/1971  Smith et al. ..................... 426/241

FOREIGN PATENT DOCUMENTS 874752  8/1961  United Kingdom ............... 426/240

Primary Examiner—George Yeung
Attorney, Agent, or Firm—Fetherstonhaugh & Co.

[57] ABSTRACT

A process for preserving fresh fruit or vegetable products comprises the steps of; heating the fruit or vegetable product rapidly and uniformly to a temperature sufficient to destroy the natural enzymes which are present in the product without cooking the product, and immediately thereafter, cooling said product rapidly to a cold condition to remove the enzyme destroying heat before any significant cooking of the product can occur and to cool the product to a temperature which will inhibit deterioration of the freshness thereof. Shortly thereafter, while the product remains in said cold condition, it is placed in a sealed gas-type package. Shortly thereafter the package product is irradiated to an extent sufficient to sterilize the product and prevent the formation of degenerative gas in the product, without damaging the product to thereby provide an enzyme-free, sterile and hermatically packaged fruit or vegetable product which has its fresh flavor and texture characteristics substantially unaltered and which can be stored without deterioration of freshness, flavor or texture for a long time.

3 Claims, 1 Drawing Sheet

PROCESS FOR PRESERVING FRESH FRUIT AND VEGETABLES

FIELD OF INVENTION

This invention relates to the preservation of fresh fruit and vegetables. In particular, this invention relates to an improved process for prolonging the storage life of fresh fruit and vegetables at ambient storage temperatures without deterioration of freshness, flavour and texture.

BACKGROUND OF THE INVENTION

Despite the fact that fresh fruit and vegetables have been preserved by many methods, the systems which have been developed to date all tend to result in a loss of freshness during processing or a loss of freshness after a short period of storage. In addition, the texture and flavour of the fruits and vegetables which are preserved by present methods is also significantly changed.

It is well known to refrigerate or freeze fruit and vegetables in an attempt to prolong storage life of these products. It is also well known to use hermatic seal film, bags, packages or containers, with or without inert gases, to increase the storage life of fresh fruit and vegetables. In addition, attempts have been made to increase storage life by subjecting the fruits and vegetables to irradiation. While each of these techniques provides an improvment over the mere storing of the fruits and vegetables at ambient temperature, the systems have serious limitations whether used individually or in combination.

Some fruits such as papaya and mango and the like cannot be frozen without destroying the texture and flavour. Furthermore, without the deactivation of enzymes, ethylene gas is produced and the flavour and texture of the products deteriorates rapidly, even when refrigerated. Radapperation has proven to be the most effective long range chemical free way of preseving food such as fruit and vegetables. In this process, the fruits and vegetables are cooked and are then placed in a hermatic sealed container which is then sterilized by an irradiation process. This process is not suitable for fresh fruit or vegetable preservation because the texture and the flavour is destroyed.

Enzymes are a group of proteins found in living plant cells which catalyze a variety of chemical reactions. Over one thousand such enzymes have been discovered in fruits and vegetables. When fruits and vegetables are harvested, it is normal for senescence to set in. During this period ethylene gas is formed within the fruit or vegetables. This gas triggers the activation of the enzymes, e.g. breakdown of pectin, protein, etc., which causes a breakdown of the fruit or vegetables.

Enzymes are deactivated by heat to coagulate or denature at temperatures over 50° C.

The freshness, texture and flavour of many fruits and vegetables will be adversely affected if the fruit or vegetable is held at the enzyme deactivating temperature beyond a critical dwell time which varies with different fruits or vegetables. Generally if a fruit or vegetable is heated to a temperature of 90° C. and is held at this temperature for ten minutes, the naturally occurring enzymes will be deactivated.

It is known that fruits and vegetables can be damaged if subjected to excessive irradation and consequently it is desirable to minimize the radiation dosage used for the purpose of sterilizing fruits and vegetables.

Research and reports from medical authorities show that many people are allergic to sulphur dioxide. Sickness and death have resulted from consumption of sulphur dioxide. Sulphur dioxide is used in fruit and vegetable salads, dried fruits, etc. to retain freshness, colour and to partially preserve.

The present process allows cut fruits and vegetables, e.g. fresh fruit salad and fresh vegetable salad to be prepared, hold and eaten without the need to use sulphur dioxide as a preservative.

SUMMARY OF THE INVENTION

It is an object of the present invention to provide a process which will substantially increase the storage life of fresh fruits and vegetables without destroying their freshness, texture or flavour.

According to one aspect of the present invention, a process for preserving the freshness, flavour and texture of fresh fruits or vegetable products comprising the steps of heating the fruit or vegetable product rapidly and uniformly by means of a microwave heating system to a temperature and retaining the product at the enzyme deactivating temperature for a dwell time sufficient to deactivate all of the natural enzymes which are present in the product without cooking the product, and immediately thereafter, cooling said product rapidly to a sufficient extent to remove the enzyme deactivating heat before any cooking of the product can occur, and to cool the product to a temperature which will inhibit deterioration of the freshness, flavour and texture thereof and shortly thereafter, while the product remains in said cold condition, packaging and hermetically sealing the cooled product in a container which contains an inert gas, irradiating the packaged product, using a food sterilizing form of radiation to an extent sufficient to sterilize the product and prevent the formation of degenerative gas in the product, without damaging the product to thereby provide an enzyme-free, sterile and hermetically packaged fruit or vegetable product which has its fresh flavour and texture characteristics substantially unaltered and which can be stored without deterioration of freshness, flavour or texture for a long time.

The invention will be more clearly understood after reference to the following detailed specification read in conjunction with the drawings wherein:

FIG. 1 is a diagram illustrating the various steps of the process of the present invention.

Fruits and vegetables which can be processed by the present invention include: apples, oranges, grapefruit, lemon, grapes, peaches, nectarines, olives, cherries, elderberries, avocado, mango, gooseberries, strawberries, raspberries, boysenberries, youngberries, bananas, tomatoes, guava, pineapple, soursop, jackfruit, broccoli, cauliflower, carrots, peas, potatoes, french fries, oka, beets, onions and peppers.

Various other fresh fruit and vegetables are capable of being orocessed by the present invention and the above list is intended to be representative rather than limiting.

Before a particular type of fruit or vegetable is processed it is necessary to carry out some preliminery enzymic testing to determine its optimum enzyme deactivating dwell time. The optimum enzyme deactivating dwell time is the maximum time for which a particular type of fruit or vegetable may be maintained at the enzyme deactivating temperature without adversely affecting its freshness, texture and flavour. The temperature of the product should be controlled by suitable sensor devices to maintain the product at an even temperature. Samples of the particular fruit or vegetable which is to be processed should be heated to the required enzyme deactivating temperature and held at this temperature for various time periods and then subjected to laboratory and taste tests to determine an appropriate dwell time. Periodic tests should also be carried out during production runs to ensure the the dwell time is correct. It is desirable to maximize the enzyme deactivating dwell time to thereby permit the sterilizing irradiation dosage to be minimized. If the product is overheated it will soften or rupture the cell walls of the product and give the product a cooked flavour and texture.

As illustrated in FIG. 1 of the drawings, the fruit or vegetable products are sorted as soon as possible after harvesting. The products which contain rot or which are diseased or off-colour, deformed or irregular in shape or subject to other defects are rejected. The products are then graded for size or weight and products of a substantially uniform grade are transferred to a heating unit which is preferably in the form of a microwave unit. The products are then subjected to a high speed uniform heating to a temperature of approximately 50° to 85° C. to deactivate the enzymes.

Testing must be carried out in order to determine the amount of heating required in order to heat a particular fruit or vegetable product to the required temperature range. In a particular microwave unit it will be apparent that the amount of energy required to heat products of one grade may be significantly different from that required to heat products of another grade of the same product and it is for this reason that grading is carried out before heating. Having predetermined the settings required in the microwave unit to obtain the required heating for a particular grade of a particular product, it is possible to process all of the product of the particular grade and then adjust the settings of the microwave unit when product of a different grade is supplied from the grader. In order to achieve a uniform heating of the fruit or vegetable product, the product is preferably caused to rotate in the microwave heating unit. This can be achieved by providing a simple rotating or tumbling mechanism which will cause the items to be rotated as they are advanced continuously through the microwave unit. Screw feeding devices suitable for this type of rotation are available in many mechanisms in which rotation of a fruit or vegetable product is required and will not therefor be described. Mechanisms which will handle cut fruit, fruit salad and the like, without any loss of juice, are also available.

When the fruit or vegetable product has been heated in a microwave unit to a temperature of about 50° to 85° C., it is removed from the microwave unit and is then held at a temperature of about 70° C. for the appropriate predetermined dwell time. When cut fruit or cut vegetables are being processed, a predetermined quantity of the product is placed in a container to ensure that complete deactivation of the enzyme and complete cooling is achieved. By ensuring that the fruit or vegetable product is held at the appropriate enzyme deactivating temperature for the appropriate dwell time complete deactivation of the enzymes is achieved. Immediately after enzyme deactivation, the product is submerged in cold water at a temperature of about 1° to 5° C. and cooled to the water temperature of about 1° to 5° C. and is retained in this body of water at this temperature for about thirty minutes.

In the case of cut fruits and vegetables, care must be taken to prevent water absorption into the product.

Cooling is preferably carried out by immediately submerging the fruit or vegetable products in cold water. The cooling water is preferably agitated to obtain rapid cooling. When the fruit or vegetable products are cooled to a substantially uniform temperature of about 1° C., it is then removed from the cooling water and without allowing it to be reheated, it is then packaged in a hermetic sealed inert gas filled package. The packages in which the product is sealed may contain an ethylene absorbing chemical. After cooling, the fruit or vegetable product may be dried before packaging. Alternatively, the fruit or vegetable product may be packaged with some water remaining therein. In either case, the fruit or vegetable product is packaged before it is allowed to warm up to any significant extent from the temperature achieved in the cooling stage. The package which is used is preferably in a form suitable for use in subsequent display of the fruit or vegetable product for sale. It is important to note that the packaging must be capable of providing a hermatic seal which will not permit air, water, bacteria, yeast, mold, or the like, to enter the package. Furthermore, the packaging material must be selected to ensure that it will not deteriorate under normal storage conditions. In addition, a blanket of nitrogen, carbon dioxide or any food approved inert gas may be provided in the package to further inhibit deterioration during storage. Oxygen in the air causes oxidation of many natural chemicals within the fruits and vegetables and for this reason air must be replaced by an inert gas.

The packaged fruit or vegetable products are then irradiated in an irradiation chamber of an irradiation device. The radiation dosage will vary depending upon the type of fruit or vegetable product which is to be processed. I have found that when using gamma wave radiation a dosage higher than 0.85 kgy. tends to damage to centain fruit. In addition in fruit/vegetables such as onions and garlic, internal discolouration (browning) takes place in the growth zones.

Any one of the microwave heating ovens which are presently available on the market may be used to heat the fruit or vegetable products. A suitable gamma wave food irradiation unit is manufactured by Atomic Energy of Canada Ltd. and is identified by Model No. Js-8900. Many other suitable units are available from other sources.

A 1965 report issued by the surgeon general of the U.S.A. army indicates that foods irradiated up to absorbed doses of 5.6 KGY with a cobalt 60 source of gamma irradiation or with electrons with energies up to 10 million electron volts have been found to be wholesome, i.e. safe and nutritionally adequate. In November, 1980 in Geneva the joint FAO/IAEA/Who expert committee on wholesomeness of Irradiated Foods concluded that the irradiation of any food commodity, up to overall, average dose of 10 KGY presents no toxicological hazard; hence toxicological testing of foods so treated is no longer required. Irradiation of foods up to an overall average dose of 10 KGY introduces no special nutritional or microbiological problems.

EXAMPLE 1

An apple weighing 165.4 grams taken from cold storage at 4.5° C. (40° F.) was placed in a microwave unit. The microwave was activated to emit 750 watts for 95 seconds and as a result the apple was heated to an interior temperature of 71.1° C.

The apple was then submerged in a body of water which is at a temperature of 70° C. and it is held in the water to ensure that it remains at a temperature of 70° C. about two minutes to ensure complete deactivation of the enzymes. The apple was then removed from this body of water and is immediatly submerged in cold water at a temperature of about 1.1° C. and is retained in this body of water for about thirty minutes. The internal temperature of the apple was as a result cooled to a temperature of about 3.6° C.

After removal from the water the apple was placed in a plastic bag. The bag was then flushed with nitrogen gas. The bag was then sealed and the bag and its contents were then irradiated with 0.70 KGY.

After irradiation the bag and its contents were stored at room temperature.

EXAMPLE 2

A tomato weighing 153.9 grams was used instead of an apple. The initial temperature to of the tomato was 4.5° C.

The tomato was heated to 71.1° C. for 93 seconds as in Example 1. All other treatment was the same as for the apple in Example 1.

EXAMPLE 3

A pepper (red bell) weighing 200.4 grams was used instead of an apple. The initial temperature of the pepper was 4.5° C.

The pepper was heated to 71.1° C. (160° F.) for 115 seconds in the microwave as in Example 1. All other treatments and results were the same as for the apple in Example 1.

EXAMPLE 4

Cut chilled (4.5° C.–40° F.) fruit salad (½" cut) consisting of melon, pineapple, apple, peaches, weighing 165.0 grams was placed in a glass beaker size 42 mm×90 mm and placed in a microwave unit.

The microwave unit was activated to emitt 750 watts for 96 seconds. The fruit salad had an interior temperature of 72.0° C. (162° F.).

The beaker was removed from the microwave unit and held for about 2 minutes.

The beaker and contents were placed in cold water (not to allow water to enter the top of the beaker) for 35 minutes where it reached a temperature of 4.0° C. (39° F.).

The fruit salad was placed into a hermetic sealed plastic container, flushed with nitrogen gas and sealed.

The package was irradiated with 0.7 KGY.

After irradiation the package and its contents were stored at room temperature.

After storing the products produced in Examples 1 to 4 at room temperature for six months, the packages were opened and the products were found to have retained most, if not all of their original freshness, flavour and texture.

EXAMPLE 5

Example 4 was duplicated but neither heating nor enzyme deactivation was done.

The 165 grams of fruit salad was placed in a hermetic sealed plastic container and flushed with nitrogen gas and sealed.

The package was irradiated with 1.2 KGY before complete sterility (as compared to 0.7 KGY with microwave). Further the enzymes were not deactivated. The product did not have the freshness, flavour or texture of the original fruit.

Combined microwave and irradiation have a synergistic effect on sterilization requiring less irradiation doseage.

I claim:

1. A process for preserving the freshness, flavour and texture of fresh fruits or vegetable products comprising the steps of:
   (a) heating the fruit or vegetable product rapidly and uniformly by means of a microwave heating system to an enzyme deactivating temperature and retaining the product at the enzyme deactivating temperature for a dwell time sufficient to deactivate all of the natural enzymes which are present in the product without cooking the product, and immediately thereafter,
   (b) cooling said product rapidly to a sufficient extent to remove the enzyme deactivating heat before any cooking of the product can occur, and to cool the product to a temperature which will inhibit deterioration of the freshness, flavour and texture thereof and shortly thereafter, while the product remains in said cold condition,
   (c) packaging and hermetically sealing the cooled product in a container which contains an inert gas,
   (d) irradiating the packaged product, to sterilize the product and prevent the formation of degenerative gas in the product, without damaging the product to thereby provide an enzyme-free, sterile and hermetically packaged fruit or vegetable product which has its fresh flavour and texture characteristics substantially unaltered and which can be stored without deterioration of freshness, flavour or texture for a long time.

2. A process as claimed in claim 1, wherein the product is heated to a temperature of about 50° to 70° C.

3. A process as claimed in claim 1, wherein the product is cooled by immersing it in water at a temperature of about 1° C.

* * * * *